Nov. 21, 1967 A. W. MacCORKELL 3,353,474
BEVERAGE DISPENSER

Filed Nov. 24, 1965 2 Sheets-Sheet 1

INVENTOR.
ALBERT W. MacCORKELL
BY
William H. Drummond
ATTORNEY

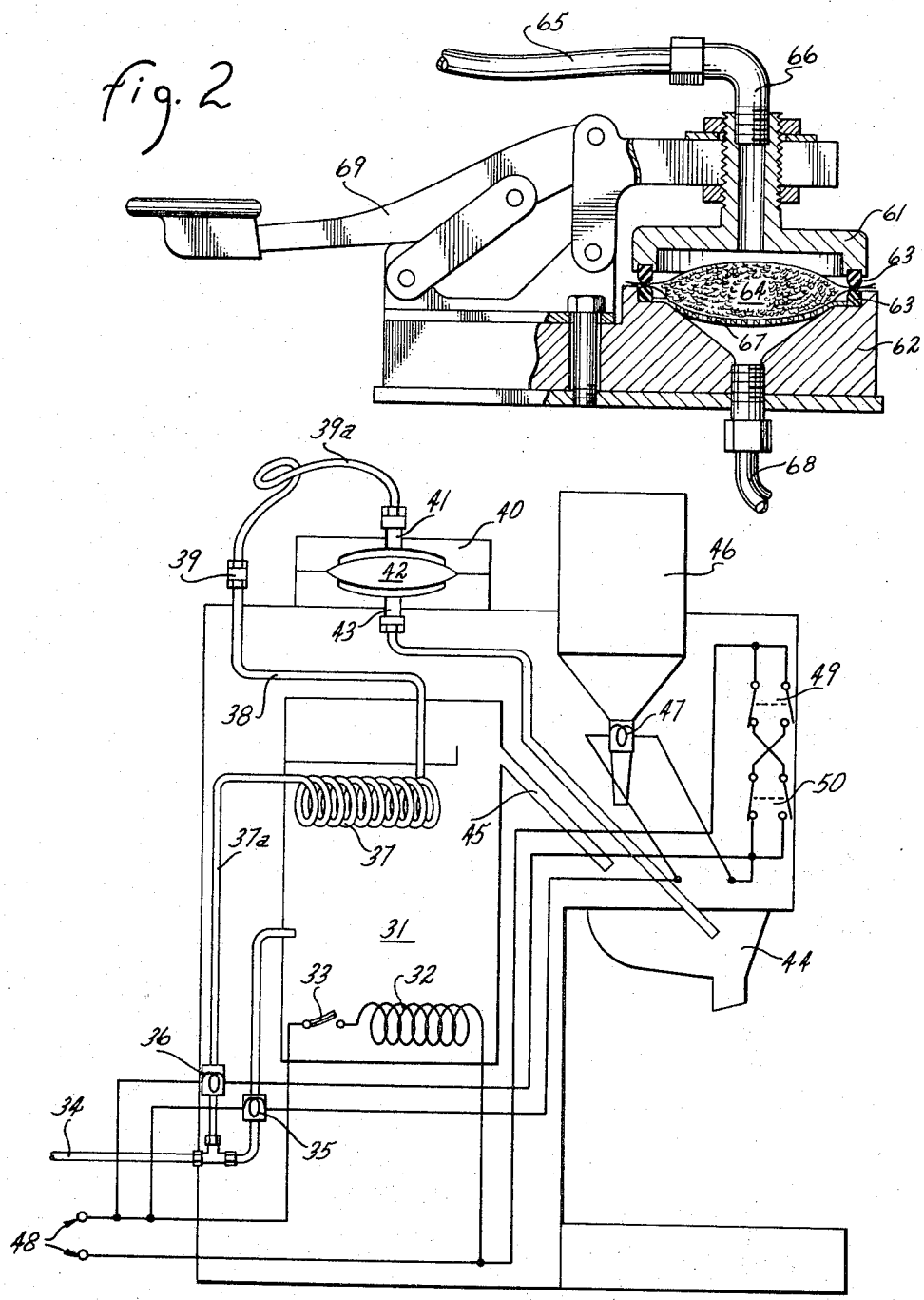

United States Patent Office 3,353,474
Patented Nov. 21, 1967

3,353,474
BEVERAGE DISPENSER
Albert W. MacCorkell, 3925 N. 31st Ave.,
Phoenix, Ariz. 85017
Filed Nov. 24, 1965, Ser. No. 509,491
1 Claim. (Cl. 99—281)

This invention relates to beverage dispensing apparatus. More particularly, the invention concerns beverage dispensing apparatus capable of dispensing, at the pleasure of the operator, both fresh-brewed beverages and so-called "instant" beverages. In a further aspect, the invention concerns beverage dispensing apparatus capable of dispensing both fresh-brewed and instant coffee, or fresh-brewed coffee and instant tea.

As used herein, the term "instant beverage" will be understood to denote those beverages produced by dissolving a water-soluble concentrate in an appropriate quantity of water. For example, the instant beverages contemplated herein include, without limiting the generality thereof, instant coffee, instant tea, various diet drinks and various specially produced cereal drinks such as the familiar "Postum" beverage.

A number of vending and dispensing devices are available to provide both so-called "fresh-brewed" coffee or tea beverages as well as the various instant beverages. However, these machines, typically used in vending operations, are complicated, expensive and generally of a size not suitable for use in small offices and the like which cannot afford the space requirements or high operational costs usually associated with the available beverage dispensing devices. Accordingly, it would be highly desirable to provide a compact, yet suitably efficient device having low initial and operating costs associated therewith and providing a plurality of hot beverages at the pleasure of the operator.

It is a principal object of the invention to provide a highly efficient, compact dispensing apparatus for preparing only one or a very small number of cups of hot beverages.

Another object of the invention is the provision of a dispensing apparatus which is capable of dispensing both fresh-brewed and instant beverages at the pleasure of the operator.

Yet another object of the invention is the provision of dispensing apparatus which is simple in operation and which requires practically no maintenance.

Still another object of the invention is the provision of an apparatus capable of providing fresh-brewed coffee or instant coffee at the pleasure of the operator.

A still further object of the invention is the provision of a dispensing apparatus for preparing small quantities of fresh-brewed coffee but having the capability of providing a somewhat larger number of servings when the occasion demands.

These and other objects and advantages of the invention will become apparent to those skilled in the art from the following detailed description of the invention and the presently preferred embodiments thereof, taken in connection with the drawings in which:

FIG. 2 is a cross-section view of the fresh-brewing apparatus forming a portion of the invention; and FIG. 3 is a schematic cross-sectional view of the apparatus of FIG. 1, showing generally the arrangement of the internal parts and the wiring and piping diagrams.

Figure 1:
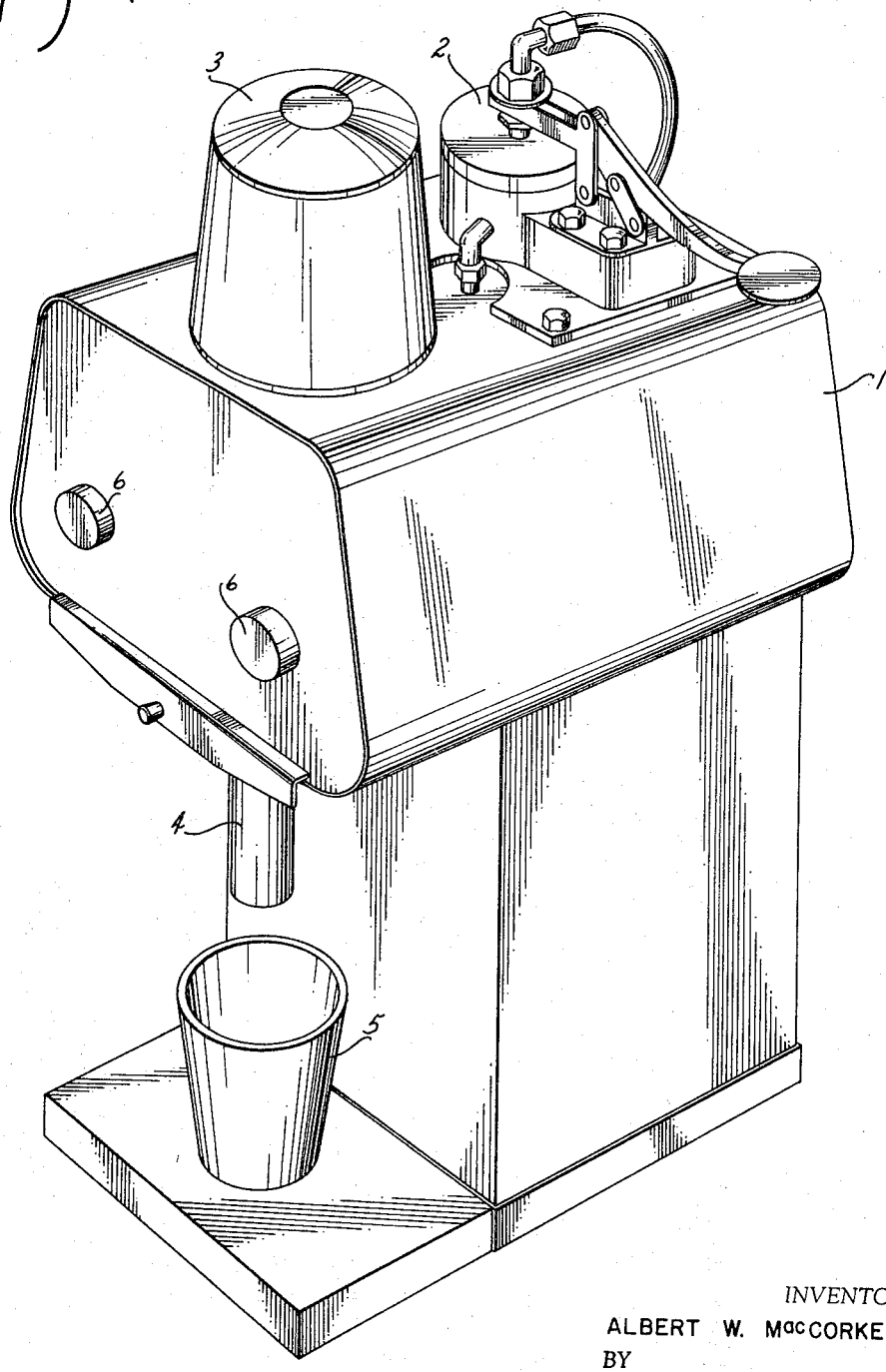
FIG. 1 is an external perspective view of the embodiment of the invention chosen for purposes of illustration.

Briefly, in accordance with the invention, I provide a dispenser which is adapted to provide both fresh-brewed beverages and instant beverages at the pleasure of the operator. The apparatus comprises, in combination, a water-heating tank which also serves as storage capacity for hot water, the reservoir capacity enabling the apparatus to provide multiple servings of instant beverages when the occasion demands. The water-heating tank is provided with a thermostatically controlled water-heating element, advantageously an electrical element. A tubular heat exchanger is positioned within the water-heating tank in such manner as to be immersed in the hotter portion of the water contained therein when the device is in operation. This tubular heat exchanger is used for heating and storing generally smaller quantities of water used when the apparatus is operated in its fresh-brewing mode. The water supply to the unit is controlled by a solenoid-actuated valve or valves which direct the water supply into either the water-heating tank or the heat exchanger, depending upon the desired mode of operation. A supply of instant beverage concentrate is stored within the dispenser and measured quantities of this concentrate are dispensed into a mixing chamber upon manipulation of the proper control which also feeds a quantity of hot water from the reservoir tank into the mixing chamber, thereby dissolving the concentrate which is dispensed to a drinking vessel such as a cup. In the operation of the apparatus for fresh-brewing, the water is directed through the heat exchanger and the hot water thereby produced is directed to a fresh-brewing chamber where it is percolated under pressure of the water supply line through a water-permeable bag of coffee or other beverage base. The fresh-brewed beverage then is dispensed through the discharge spout of the apparatus into a drinking vessel.

Turning now to the drawings for a more detailed description of the apparatus of the invention, FIG. 1 shows the general external arrangement of the parts of the embodiment chosen for purposes of illustration. The apparatus comprises a housing, generally indicated by reference numeral 1, upon which is mounted the fresh-brewing apparatus, generally indicated by reference numeral 2. The supply of instant beverage concentrate is contained within the enclosure 3. The beverage is dispensed through the discharge tube 4 into a typical drinking vessel such as a cup 5, as shown. Either fresh-brewed coffee or hot instant beverage is obtained by pressing one of the buttons 6.

In FIG. 3, the operative elements of the invention are shown schematically. The water-heating tank and hot water reservoir 31 is provided with an electrical heating element 32 which is controlled by the thermostat 33. The water supply conduit 34 supplies water under line pressure to the device. The water is directed by means of solenoid valves 35 and 36 into either the interior of the water-heating tank 31 or into the inlet of a tube-type heat exchanger 37 which may be simply fabricated by coiling the conduit 37a a sufficient number of times to provide the requisite heat-exchange area. The heated water from the heat exchanger passes by means of a conduit 38 through a coupling 39 and through a flexible conduit 39a into the fresh-brewing chamber, generally indicated by reference numeral 40. The hot water entering the inlet to the brewing chamber 41 passes through a water-permeable bag 42 of coffee or other beverage base under line pressure and the brewed beverage discharges from the brewing chamber through the outlet 43 where it is conducted to the mixing-discharge chamber 44 of the apparatus.

When the device is operated to produce instant beverages, the solenoid valve 35 is opened, allowing supply water to enter the water-heating tank 31 thereby causing the heated water in the upper region thereof to overflow through a conduit 45 into the mixing-dispensing chamber 44. Meanwhile, under this mode of operation, a measured quantity of instant beverage concentrate contained in the supply container 46 is dispensed by means of a solenoid-actuated valve 47 into the mixing-dispensing chamber 44 where it is dissolved in the hot water from conduit 45 to form the instant beverage solution. Power is supplied to the apparatus through electrical leads 48, this power being controlled by switches 49 and 50 which control the operation of the solenoid valves 35, 36 and 47. These switches are electrically connected to prevent accidental operation of the two modes of the apparatus simultaneously. Thus, the switch 50 must be open before depressing the switch 49 which will activate the solenoid valve feeding water to the supply tank and actuating the solenoid 47 dispensing the instant beverage concentrate.

FIG. 2 is a cross-sectional view showing the details of the fresh-brewing assembly. The assembly comprises a pair of opposed hollowed-out, generally cylindrical members 61 and 62. The hollowed-out members are provided with suitable gasket seals 63 at their periphery which grasp and position a water-permeable bag 64 of coffee or other beverage base therebetween. Hot water enters the brewing chamber through a flexible conduit 65 terminating in an elbow 66 communicating with the interior of the brewing chamber. Hot water flows through the water-permeable bag 64 which is supported by a screen 67. The fresh-brewed beverage discharges from the brewing chamber through exit conduit 68. A toggle assembly, generally indicated by reference numeral 69, is provided for convenient and fast opening of the brewing chamber (by raising the hollowed-out member 61 as will be obvious from the drawing), thereby permitting removal of the water-permeable bag and insertion of a fresh bag for the preparation of the next quantity of fresh-brewed beverage.

Water-permeable bags of coffee suitable for use in the device hereabove described are commercially obtainable from the Continental Coffee Company and are of the type generally used in the automatic coffee vending machine arts.

Having fully described my invention to the extent necessary to enable those skilled in the art to use and practice the same, and having disclosed the presently preferred embodiments thereof, I claim:

A dispenser adapted to provide both fresh-brewed beverages and instant beverages comprising in combination:
  (a) a water heating tank having a cold water inlet and an overflow hot water outlet;
  (b) a thermostatically controlled electrical water-heating element in said tank;
  (c) a tubular heat exchanger positioned in said tank;
  (d) a mixing-dispensing chamber having an outlet adapted to discharge liquid into a drinking vessel;
  (e) a fresh-brewing chamber having a hot water inlet and a brewed beverage outlet and adapted to be opened and closed for insertion and removal of water-permeable bags of beverage base;
  (f) solenoid-actuated dispensing means for dispensing a measured quantity of water-soluble instant beverage concentrate into said mixing-discharge chamber;
  (g) first conduit means for supplying cold water under pressure to said dispenser;
  (h) solenoid-actuated valve means in said conduit means for directing the cold water into either the tube side of said heat exchanger or into the cold water inlet of said water-heating tank;
  (i) second conduit means communicating between the discharge of said heat exchanger and the hot water inlet of said fresh-brewing chamber;
  (j) third conduit means communicating between the brewed beverage outlet of said fresh-brewing chamber and said mixing-dispensing chamber;
  (k) fourth conduit means communicating between the overflow hot water outlet of said water-heating tank and said mixing-discharge chamber;
  (l) electrical switch means controlling said solenoid-actuated dispensing means and said solenoid-actuated valve means to provide as modes of operation
    (1) a first mode whereby cold water flows under pressure from the first conduit means through the valve means, through the tube-side of the heat exchanger, into the fresh-brewing chamber, through the water-permeable bags of beverage base and the brewed beverage flows from the fresh brewing chamber into the mixing-discharge chamber and thence to a drinking vessel, and
    (2) a second mode whereby cold water flows from the first conduit means through the valve means, into said water heating tank causing heated water to overflow into the mixing-discharge chamber where it mixes with and dissolves a measured amount of water-soluble instant beverage concentrate delivered by said dispensing means, the resulting instant beverage flowing thence into a drinking vessel.

No references cited.

WILLIAM I. PRICE, *Primary Examiner.*